US012405390B2

(12) United States Patent
Sakumura et al.

(10) Patent No.: US 12,405,390 B2
(45) Date of Patent: Sep. 2, 2025

(54) CONTROL APPARATUS, SYSTEM, METHOD, AND PROGRAM

(71) Applicant: Rigaku Corporation, Tokyo (JP)

(72) Inventors: Takuto Sakumura, Tokyo (JP); Yasukazu Nakaye, Tokyo (JP); Tetsuya Ozawa, Tokyo (JP); Kazuyuki Matsushita, Tokyo (JP)

(73) Assignee: Rigaku Corporation, Tokyo (JP)

( * ) Notice: Subject to any disclaimer, the term of this patent is extended or adjusted under 35 U.S.C. 154(b) by 264 days.

(21) Appl. No.: 17/794,774

(22) PCT Filed: Dec. 22, 2020

(86) PCT No.: PCT/JP2020/048018
§ 371 (c)(1),
(2) Date: Jul. 22, 2022

(87) PCT Pub. No.: WO2021/153107
PCT Pub. Date: Aug. 5, 2021

(65) Prior Publication Data
US 2023/0115151 A1 Apr. 13, 2023

(30) Foreign Application Priority Data
Jan. 27, 2020 (JP) ................. 2020-011214

(51) Int. Cl.
*G01T 1/17* (2006.01)
*G01T 1/24* (2006.01)

(52) U.S. Cl.
CPC .............. *G01T 1/17* (2013.01); *G01T 1/247* (2013.01)

(58) Field of Classification Search
CPC .............. G01T 1/17; G01T 1/247; G01T 1/36
See application file for complete search history.

(56) References Cited

U.S. PATENT DOCUMENTS 7,902,976 B2 * 3/2011 Doughty .............. H04N 25/771
340/539.22
8,866,094 B2 10/2014 Tsukiyama et al.
(Continued)

FOREIGN PATENT DOCUMENTS

JP 2011-085479 A 4/2011
JP 2015-523554 A 8/2015
(Continued)

OTHER PUBLICATIONS

Fornaro et al., Dual- and multi-energy CT: approach to functional imaging, 2011, Insights Imaging vol. 2, pp. 149-159. (Year: 2011).*
(Continued)

*Primary Examiner* — Marcus H Taningco
(74) *Attorney, Agent, or Firm* — ASLAN LAW, P.C.

(57) ABSTRACT

A control apparatus, system, method and program that enable simultaneous measurement of counts of multiple energy ranges in an efficient configuration are provided. A control apparatus 200 for controlling an X-ray detector 100 and outputting a measurement result comprises a setting section 220 configured to set the energy range of X-rays to be detected for each unit region of the X-ray detector 100, a data management section 250 configured to acquire a count value of the set energy range for each unit region as measurement data by a result of the X-ray measurement, and an outputting section 270 configured to output the measurement data. Thus, counting of multiple energy ranges can simultaneously be measured.

16 Claims, 11 Drawing Sheets

(56) References Cited

U.S. PATENT DOCUMENTS

| | | | |
|---|---|---|---|
| 9,753,160 | B2 | 9/2017 | Bellazzini |
| 10,222,491 | B2 | 3/2019 | Matsushita et al. |
| 10,551,510 | B2 | 2/2020 | Sakumura et al. |
| 2010/0301224 | A1* | 12/2010 | Morel ............... H01L 27/14661 250/370.09 |
| 2011/0036988 | A1* | 2/2011 | Campbell ............... G01T 1/026 250/370.07 |
| 2012/0280131 | A1* | 11/2012 | Spartiotis ............... H04N 25/46 250/366 |
| 2014/0185781 | A1* | 7/2014 | Reitz ....................... G01T 1/247 378/207 |
| 2014/0203182 | A1 | 7/2014 | Tsukiyama et al. |
| 2015/0139390 | A1 | 5/2015 | Bellazzini |
| 2016/0377749 | A1 | 12/2016 | Matsushita et al. |
| 2018/0203132 | A1 | 7/2018 | Sakumura et al. |
| 2019/0179038 | A1* | 6/2019 | Tseng ...................... G01T 1/208 |
| 2020/0326290 | A1* | 10/2020 | Iniewski .......... G01N 23/20008 |

FOREIGN PATENT DOCUMENTS

| | | |
|---|---|---|
| JP | 2017-009504 A | 1/2017 |
| JP | 2017-012593 A | 1/2017 |
| WO | WO 2012/077218 A1 | 6/2012 |
| WO | WO 2016/063586 A1 | 4/2016 |

OTHER PUBLICATIONS

Supplementary EP Search Report issued in EP Application No. 20 917 127.1, European Patent Office, Munich Germany, Jan. 31, 2024, 10 pages.

Ballabriga Rafael et al, "Asic developments for radiation imaging applications—The medipix and timepix family", Nuclear Instruments & Methods in Physics Research. Section A, vol. 878, Geneva Switzerland, Jan. 1, 2018, 14 pages.

Pablant N A et al, "Novel energy resolving xray pinhole camera on Alcator C-Mod", Review of Scientific Instruments, American Institute of Physucs, 2 Huntington Quadrangle, Melville, NY 11747, vol. 83, No. 10, Oct. 1, 2012, 3 pages.

Julien Marchal et al, "Detective quantum efficiency model of single-X-ray-photon counting hybrid pixel detectors", Journal of Instrumentation, Institute of Physics Publishing, Bristol, GB, vol. 7, No. 11, Nov. 28, 2012, 16 pages.

Anne Marie March et al., "Probing Transient Valence Orbital Changes with Picosecond Valence-to- Core X-ray Emission Spectroscopy", The Journal of Physical Chemistry C. Document states "Published: Jan. 17, 2017," 2620-2626 (7 pages).

N.A. Pablant et al. "Novel energy resolving x-ray pinhole camera on Alcator C-Mod." Article in The Review of scientific instruments • Oct. 2012 Document states "(Dated: May 8, 2012)." 4 pages.

L. F. Delgado-Aparicio et al. "Multi-energy SXR cameras for magnetically confined fusion plasmas" Document states "(Dated Sep. 28, 2016)." 7 pages.

Dectris, http://web.archive.org/web/20150924212647/https://www.dectris.com/specificsolutions_ examples.html. 11 pages.

JP Office Action issued in JP Application No. 2021-574544, JPO, Japan, Jan. 9, 2024, 3 pages.

CN Office Action, The State Intellectual Property Office of People's Republic of China, Republic of China, Mar. 24, 2025.14 pages.

* cited by examiner

CONTROL APPARATUS, SYSTEM, METHOD, AND PROGRAM

TECHNICAL FIELD

The present invention relates to a control apparatus for controlling an X-ray measurement apparatus and outputting a measurement result, a system including the same, a method, and a program for measuring X-rays.

BACKGROUND ART

In recent years, laboratories involving detection of X-ray with different energies have been conducted (see Non-Patent Document 1). In the experiment described in Non-Patent Document 1, fluorescence from a sample is spectrally resolved by a polycrystalline emission spectrometer having crystals divided in a dispersing direction and a focusing direction. In this experiment, the Si(111) crystal is used for the measurement of the Kα region, and the Si(220) crystal is used for the measurement of the Kβ and valence to core region, but it is necessary to perform the measurement depending on the application.

In addition, a technology for performing zero point adjustment by a combination of a DA converter and an amplifier of a detector having a fixed energy threshold is known (see Patent Document 1). A technology for storing the characteristics of each pixel for the same detector, to generate a correction table according to the input measurement conditions, using the correction table, and correcting the measured X-ray intensity data is also known (see Patent Document 2).

PRIOR ART LITERATURE

Patent Literature

[Patent Document 1] WO-A-2012/077218
[Patent Document 2] WO-A-2016/063586

Non-Patent Document

[Non-patent Document 1] "Probing Transient Valence Orbital Changes with Picosecond Valence-to-Core X-ray Emission Spectroscopy", Anne Marie March, Tadesse A. Assefa, Christina Boemer, Christian Bressler, Alexander Britz, Michael Diez, Gilles Doumy, Andreas Galler, Manuel Harder, Dmitry Khakhulin, Zoltan Ne meth, Matya s Pa pai, Sebastian Schulz, Stephen H. Southworth, Hasan Yavas, Linda Young, Wojciech Gawelda, and Gyorgy Vanko, THE JOURNAL OF PHYSICAL CHEMISTRY C 2017, 121, 2620-2626

DISCLOSURE OF THE INVENTION

Problem to be Solved by the Invention

In the experiment described in Non-Patent Document 1, it is necessary to measure X-rays of different energies in each of the divided receiving regions. However, when X-rays of different energies are to be measured, separate measurements are required for each energy, and the entire measurement takes a huge amount of time.

The present invention has been made in view of the above circumstances, and an object thereof is to provide a control apparatus, a system, a method, and a program which enable simultaneous measurement of counts of a plurality of energy ranges.

Means for Solving the Problem (1) In order to achieve the above described object, the control apparatus of the present invention is a control apparatus for controlling an X-ray detector and outputting a measurement result, and comprises a setting section configured to set an energy range of X-rays to be detected for each unit region of the X-ray detector, a data management section configured to acquire a count value of the set energy range for each unit region as measurement data by a result of the X-ray measurement, and an outputting section configured to output the measurement data, wherein the setting section sets different energy ranges in at least two or more unit regions. Thus, counting of multiple energy ranges can simultaneously be measured.

(2) Further, in the control apparatus of the present invention, the setting section performs at least one of the zero point shift and gain change of a signal input by X-ray detection for each unit region with respect to a global threshold constant in all the regions to set the energy range. Thus, the respective energy range can be set by adjusting the zero point and gain while keeping a set global threshold fixed and relatively changing the apparent threshold.

(3) Further, in the control apparatus of the present invention, the setting section performs the zero point shift by changing setting of a DA converter in the X-ray detector. Thus, it is possible to shift the zero point by utilizing the function of the DA converter.

(4) Further, in the control apparatus of the present invention, the setting section sets the energy range in each of one or a plurality of aggregation regions which are formed by aggregation of the unit regions adjacent to each other in the X-ray detector and having an arbitrary size and shape. Thus, it is possible to highly efficiently measure data in a plurality of energy ranges for the same sample at the same time.

(5) Further, in the control apparatus of the present invention, the X-ray detector is capable of acquiring images in synchronization with movement, the setting section allocates each energy range for each line perpendicular to the movement direction of the X-ray detector in the acquisition of images in synchronization with movement, and the outputting section outputs count values of all detection regions reconstructed for each of the set energy ranges. By reconstructing the data acquired in this way, it is possible to efficiently acquire the counts of a plurality of energy ranges for each position.

(6) Further, in the control apparatus of the present invention, the setting section sets each of a plurality of types of energy ranges to be distributed to each unit region on the receiving surface. Thus, data of multiple kinds of energy ranges can be simultaneously acquired by still measurement, even if the position resolution is reduced.

(7) Further, in the control apparatus of the present invention, the setting section sets a repeating unit region including one unit region of all types of the energy range to be periodically repeated. Thus, data of a plurality of types of energy ranges can be simultaneously acquired by still measurement with a simple configuration.

(8) Further, the system of the present invention comprises the X-ray measurement apparatus having the X-ray detector and the control apparatus according to any one of (1) to (6) above. Thus, by the control of the X-ray measurement apparatus by the control apparatus, it is possible to respond to a request to measure simultaneous counting of a plurality of energy ranges.

(9) Further, the method of the present invention is a method of simultaneously measuring X-rays of different energies, and comprises steps of setting an energy range of X-rays to be detected for each unit region of an X-ray detector, performing X-ray measurement using the X-ray detector, acquiring a count value as measurement data in the set energy range for each unit region by a result of the X-ray measurement, and outputting the measurement data, wherein different energy ranges are set in at least two or more unit regions in setting the energy ranges. Thus, counting of multiple energy ranges can be simultaneously measured.

(10) Further, in the method of the present invention, the X-ray detector is a two-dimensional detector, and in the detecting step, a sample is irradiated with X-rays of a specific wavelength and scattered X-rays are detected by the X-ray detector, thereby diffraction X-rays and fluorescent X-rays are detected simultaneously. Thus, X-ray fluorescence analysis can be performed while X-ray diffraction measurement is performed, and an experiment can be performed more efficiently.

(11) Further, in the method of the present invention, the X-ray detector is a two-dimensional detector, and in the detecting step, a sample is irradiated with white X-rays and scattered X-rays are detected by the X-ray detector. Thus, the measurement same as scanning can be realized even if the scan range is limited.

(12) Further, the program of the present invention is a program for controlling an X-ray detector and outputting measurement results, wherein the program makes a computer execute processes of setting an energy range of X-rays to be detected for each unit region of an X-ray detector, acquiring a count value as measurement data in the set energy range for each unit region by a result of X-ray measurement, outputting the measurement data, wherein different energy ranges are set in at least two or more unit regions in setting the energy ranges. Thus, counting of multiple energy ranges can be simultaneously measured.

Advantageous Effect of the Invention

According to the present invention, counts of a plurality of energy ranges can be simultaneously measured.

BEST MODES FOR CARRYING OUT THE INVENTION

Figure 1:
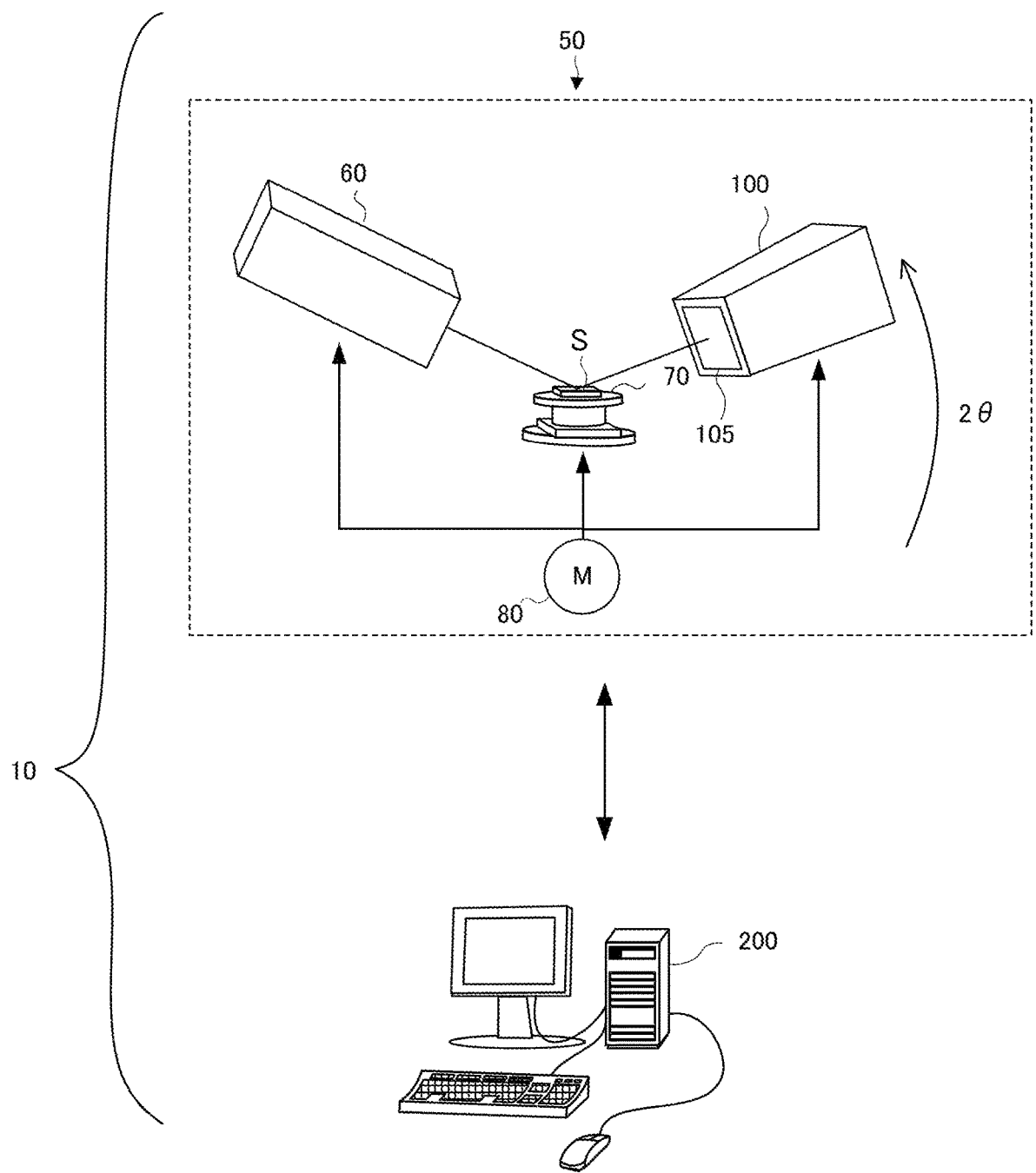
FIG. 1 is a schematic diagram showing the configuration of the entire X-ray measurement system of the present invention.

Next, embodiments of the present invention are described with reference to the drawings. To facilitate understanding of the description, the same reference numerals are assigned to the same components in the respective drawings, and duplicate descriptions are omitted.

First Embodiment (Configuration of X-Ray Measurement System)
FIG. 1 is a schematic diagram showing a configuration of an X-ray measurement system 10. As shown in FIG. 1, the X-ray measurement system 10 comprises an X-ray measurement apparatus 50 and a control apparatus 200. The X-ray measurement apparatus 50 acquires the distributed data of the count value by measurement. The control apparatus 200 controls the X-ray measurement apparatus 50 and processes the acquired data. Details of the X-ray measurement apparatus 50 and the control apparatus 200 are described later.

(Configuration of X-Ray Measurement Apparatus)
An X-ray measurement apparatus 50 comprises an X-ray irradiation section 60, a sample support section 70, a driving section 80 and an X-ray detector 100. The X-ray irradiation section 60 comprises an X-ray source and optical devices, and irradiates the sample S with X-rays. Optical devices include slits, reflectors, and the like. The X-ray source can use a target, for example, such as Mo or Cu to emit characteristic X-rays or white X-rays. A plurality of types of X-ray sources can also be used for simultaneous measure. The X-ray irradiation direction can be adjusted according to the arrangement of the X-ray irradiation section 60.

The sample support section 70 supports the sample S The sample support section 70 can adjust the posture of the sample S during preparation and measurement. The driving section 80 is composed of a generation unit of a driving force such as, for example, a stepping motor and its transmission mechanism. The driving section 80 is operated by an instruction from the control apparatus 200 and thereby the positions of the X-ray irradiation section 60, the sample support section 70 and the X-ray detector 100 can be adjusted. The driving section 80 can also move the X-ray detector 100 at the time of measurement in the 2θ direction.

X-ray detector 100 receives X-rays at the receiving surface 105 to obtain a count value of X-rays under conditions. Thus, X-rays scattered by the sample S can be detected. The X-ray detector 100 may be a one-dimensional detector, but is preferably a two-dimensional detector. Details of the X-ray detector 100 are described later.

Figure 2:
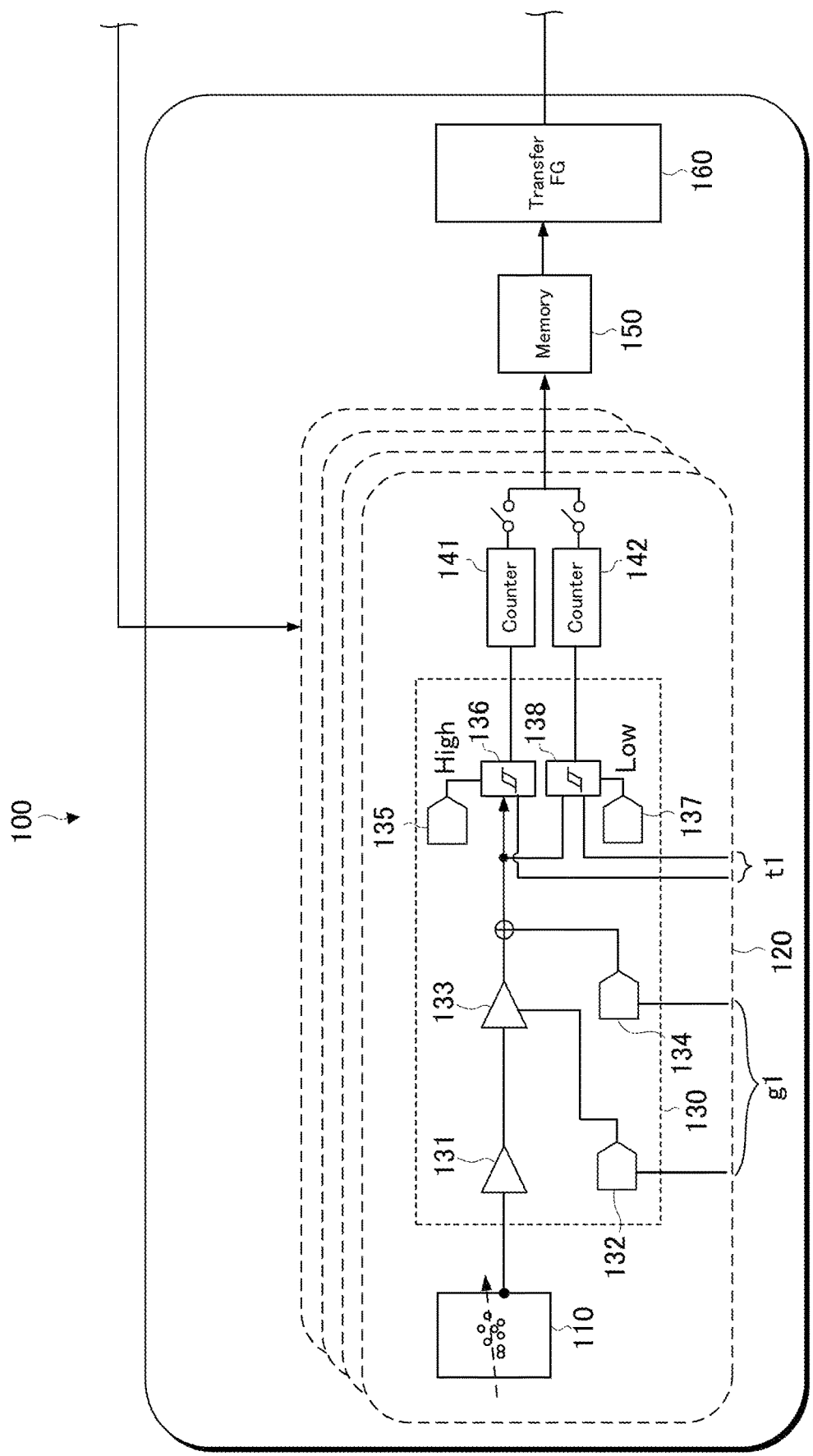
FIG. 2 is a schematic diagram showing a configuration of an X-ray detector of the present invention.

(Configuration of X-Ray Detector)
FIG. 2 is a schematic diagram showing a configuration of the X-ray detector 100. In FIG. 2, passive elements such as capacitors are omitted for simplicity of explanation. The X-ray detector 100 is a photon counting type semiconductor detector and has a two-dimensional data buffer function. The X-ray detector 100 detects X-rays and transfers detection data by frame to outside.

As shown in FIG. 2, the X-ray detector 100 comprises a sensor 110, a read circuit 120, a memory 150 and a transfer circuit 160. Incidentally, a configuration for one sensor 110 and its readout circuit 120 for convenience, i.e. a circuit configuration corresponding to one pixel (unit region) is shown in FIG. 2. In practice, however, the X-ray detector 100 shares single the memory 150 and the transfer circuit 160 for each pixel and comprises a plurality of the sensors 110 and the readout circuits 120 similar to those shown in FIG. 2. Note that "unit region" means the smallest controllable setting region that can independently detect X-rays, and basically corresponds to a pixel or strip that is the smallest sensor element. However, the unit region may include a plurality of sensor elements.

The sensor 110 generates a pulse when photons of X-rays are detected by exposure. The sensor 110 can detect intensity of an X-ray flux incident on the receiving surface 105 as plane information. The readout circuit 120 has a function of reading pulses and comprises a detection circuit 130 and counters 141, 142.

The detection circuit 130 determines whether the pulse is higher than the global threshold and, if high, sends a voltage signal to the counters 141, 142. The counters 141 and 142 can count and output a transmitted voltage signal. The memory 150 reads out and stores count values from the counters 141 and 142. The memory 150 allows for transforming the unaligned data into a real spatial arrangement and transferring of data to a later stage.

The global threshold used to determine for pulses is set constant throughout the detector. The transfer circuit 160 transfers the count value stored in the memory 150 to the control device 200.

The detection circuit 130 comprises an anterior-stage amplifier 131, a posterior-stage amplifier 133, a supply source g1 for a gain setting voltage, an anterior-stage DA converter 132 for gain adjustment, a posterior-stage DA converter 134, a supply source t1 for a threshold voltage, DA converters 135, 137 for zero point adjustment and pulse height discriminators 136, 138 for high and low-side.

The amplifiers 131 and 133 are divided into two stages. The anterior-stage amplifier 131 amplifies a current signal produced by the sensor 110. The anterior-stage amplifier 131 is, for example, a charge amplifier circuit. The anterior-stage DA converter 132 corrects the amplified input signal. The posterior-stage amplifier 133 amplifies the signal corrected by the anterior-stage DA converter 132. The posterior-stage amplifier 133 is, for example, a waveform shaping amplifier circuit. The posterior-stage DA converter 134 corrects the amplified charge signal by the posterior-stage amplifier 133.

On the output side of each of the amplifiers 131 and 133, two DA converters 132 and 134 (the supply source g1 for the gain setting voltage) for the purpose of offset correction are connected, their outputs are analog summed. The gain adjustment is performed by the DA converter 132 for adjusting the gain of the amplifier 133, the signal input to the amplifier 133 is amplified with the gain set by the DA converter 132. This circuit is shared by the LOW side and HIGH side. Thus, DA converter 132 used for gain adjustment is referred to as a Gain-DAC. Incidentally, DA converters 135 and 137 are used for zero point adjustment, referred to as Trim-DAC.

On the other hand, the zero point adjustment is performed by the DA converters 135 and 137 connected to the pulse height discriminators 136 and 138, the zero point of the signal input to the pulse height discriminators 136 and 138 is changed by the values from the DA converters 135 and 137. These circuits are configured as separate circuits on the LOW side and HIGH side. Note that the zero point adjustment means to adjust the DC level of the output signal of the amplifier.

Incidentally, the global thresholds can be set separately to the LOW side and HIGH side by the digital signals (supply source t1) input to the pulse height discriminators 136 and 138. The global thresholds are fixed on the LOW side and HIGH side in all the regions for global setting. On the other hand, the energy thresholds, as a result, are relatively adjusted by adjusting the gains and zero points of the input signal input to the pulse height discriminators 136 and 138. The energy ranges are set by setting energy thresholds on the LOW side or HIGH side only, or on both the LOW side and HIGH side.

Figure 3:
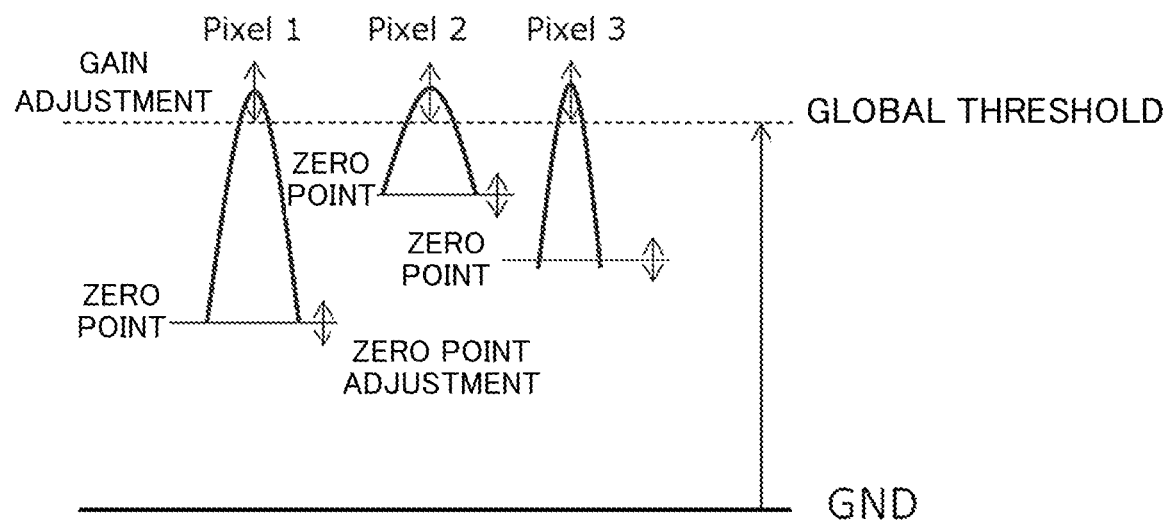
FIG. 3 is a schematic diagram showing the adjustment of the signal made for each pixel.

The DA converters 132 and 134, and the DA converters 135 and 137 are typically used to uniformly adjust the variations in the input signals for the threshold that is globally set constant for all the pixels. FIG. 3 is a schematic diagram showing the adjustment of the signal made for each of the pixels. In FIG. 3, the horizontal axis represents pixels, the vertical axis represents the energies. As shown in FIG. 3, by adjusting the gain and the zero point for each of the pixels with the four DA converters, a signal can be determined whether or not higher than the global threshold by eliminating the pixel-by-pixel variation.

In the X-ray detector 100, DA converters 132 and 134 for gain and DA converters 135 and 137 for zero point adjustment provided per pixel can be utilized, and either or both of those can be used to change the energy threshold. By applying this mechanism, it is possible to set different energy thresholds for each of the pixels 110.

The amplification degrees of the amplifiers and the offset values of the DA converters are respectively provided by settings from the control apparatus 200. In order to set an energy threshold for each of the pixels 110, it is preferable to use an existing Trim-DAC provided for uniformity correction as described above, but circuits having Trim-DAC functions may be newly provided. Further, the same function may be realized by using a driver provided for power supply in the existing circuit. In addition, although it is preferable to use a existing Gain-DAC for Gain-DAC efficiently, circuits having Gain-DAC functions may be newly provided.

Note that the amplifiers 131 and 133 may be configured by current amplifier circuits, and the DA converters 132 and 134 may be of a current output type. Thus, the signal can be effectively corrected even though there is a limitation in the size of the readout cell. The DA converter is preferably of a current output type. Since the DA converter of the current output type has a simple circuit configuration, it is suitable especially when constituting a circuit component in a minute readout cell. In that case, further by configuring the amplifiers 131 and 133 themselves also as current amplifier circuits, without providing a conversion circuit between current and voltage in the middle, it is possible to perform analog addition at the output of the amplifiers 131 and 133. However, a conversion circuit can be provided to perform the above-described analog addition after converting into a voltage signal.

The pulse height discriminators 136 and 138 on high and low side, respectively, discriminate the output signal of the posterior-stage DA converter 134 according to a threshold determined by the supply source t1 of the threshold voltage. The counters 141 and 142 count the discriminated signals on high and low sides, respectively. The source t1 of the threshold voltage is the global setting and is common for all pixels.

(Configuration of Control Apparatus)

Figure 4:
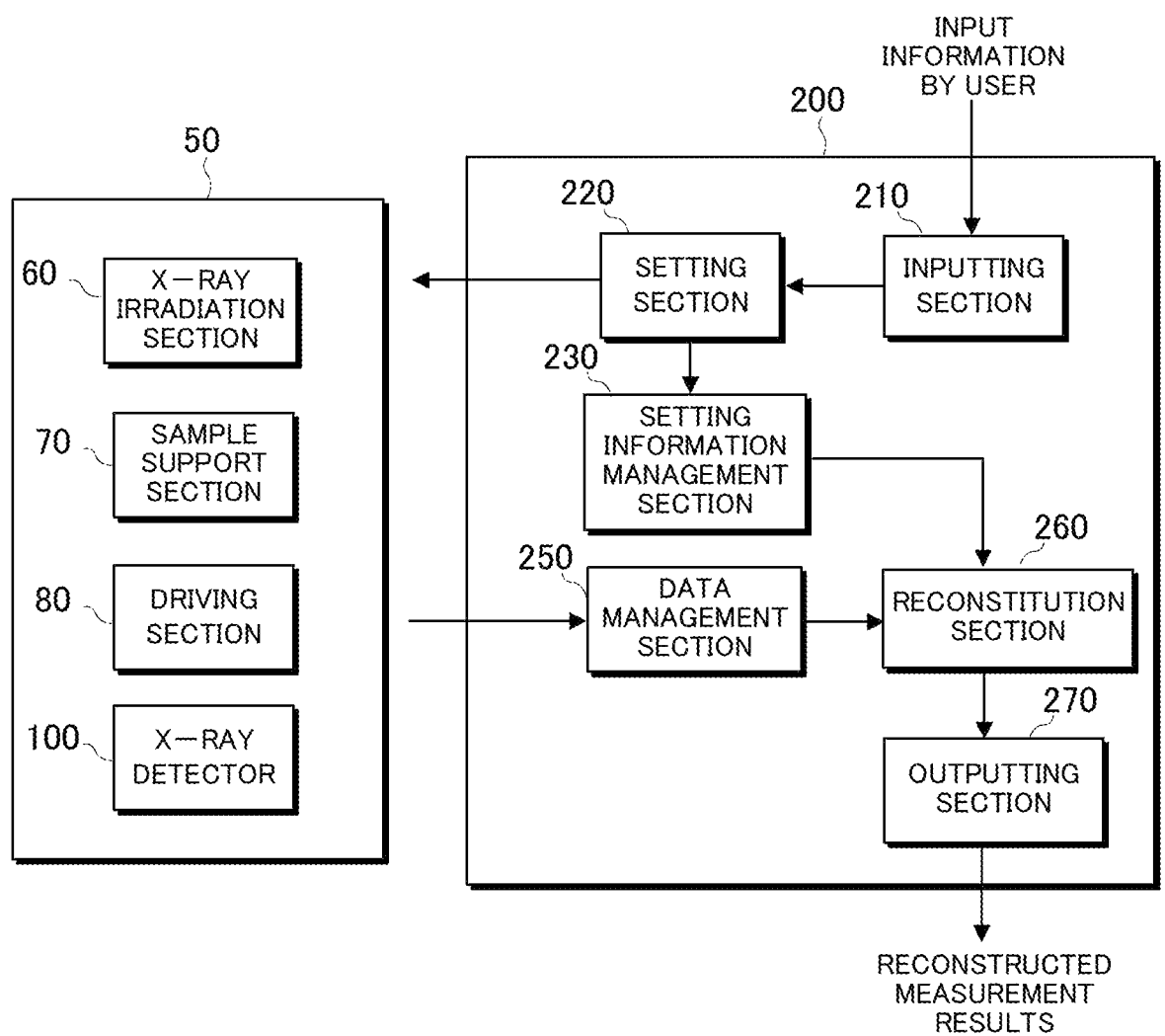
FIG. 4 is a block diagram showing the configuration of the control apparatus of the present invention.

FIG. 4 is a block diagram showing a configuration of the control apparatus 200. The control apparatus 200 is, for example, a computer such as a PC including a processor and a memory and controls the X-ray measurement apparatus 50 to process the acquired data, and outputs a measurement result by executing a program. The control apparatus 200 comprises an inputting section 210, a setting section 220, a setting information management section 230, a data management section 250, a reconstruction section 260, and an outputting section 270.

The inputting section 210 receives information input from an input device such as a mouse or a keyboard. For example, the inputting section 210 can receive information specifying the type of X-ray measurement and the setting method of the energy ranges respectively for the pixels according to the type of X-ray measurement.

When the energy range is set, the global threshold exists as a premise. The global threshold is provided for the global setting of the wave height discriminator and is a fixed value. Therefore, each of the detection circuits determines whether the pulse height from the sensor is higher than the global threshold, which is common in all the pixels. In contrast, the energy threshold is a substantial threshold that changes relative to the global threshold by changing the gain or zero point of the pulse output from the sensor for each of the pixels. Then, by setting the energy thresholds of the LOW side and HIGH side for one pixel, the energy range can be set for each of the pixels. When there is only one value as the global threshold, the energy range can be set by setting the lower limit by setting one energy threshold for each pixel. The energy threshold may be directly input by the measurer via the inputting section 210, or may be automatically input from a table, a calculation formula, or the like prepared in advance in the memory according to the type of measurement or the like.

The setting section sets the energy range of the X-rays to be detected for each unit region (pixels) of the X-ray detector and sets different energy ranges respectively for at least two or more unit regions. The setting section 220 preferably sets the energy range of the X-rays to be detected in a specific range according to the type of X-ray measurement for each pixel of the X-ray detector 100. Thus, counting of multiple energy ranges are simultaneously measured.

The setting section 220 sets the energy range as described above by performing at least one of the change of the zero point shift (offset correction) and gain (amplification degree) for each of the pixels for a constant threshold (global threshold) set globally. Thus, the threshold can be relatively changed by adjusting the zero point and gain while the threshold of the global setting remains common to all pixels and each of the energy range can be set.

The setting section 220 shifts the zero point by changing the setting of the DA converters 132 and 134 in the X-ray detector 100. In this case, the function of the existing Trim-DAC can be used, and the counting of a plurality of energy ranges can be simultaneously measured with the simple configuration.

The setting section 220 can set the energy range to be detected for each aggregation region formed by assembling pixels adjacent to each other in the X-ray detector 100. Thus, data in a plurality of energy ranges can be simultaneously measured for the same sample S.

The aggregation region may be one pixel as a minimum unit, may be a line or a block (rectangle) unit composed of a plurality of pixels, or may be all regions as a maximum unit. In addition, the aggregation region may be a divided region of all the regions, or may be only a predetermined portion in all the regions. In addition, the aggregation regions do not have to be of one type over all the regions, and may have a plurality of types of sizes, shapes, and the like. That is, the aggregation region may be one or more regions having any size and shape. Although the aggregation region may be any of one pixel to all regions of the pixels, the energy threshold is adjusted not per aggregation region, but per pixel. Note that a specific aggregation region has the same energy threshold and is different from a repeating unit region in still measurement.

The setting information management section 230 stores and manages setting information applied to the X-ray measurement apparatus 50. The setting information management section 230 outputs the managed setting information to the reconstruction section 260 in response to a request.

The data management section 250 acquires the count values in the energy ranges set respectively for the pixels as a result of the X-ray measurement, and manages the count values as measurement data in association with the zero point and the threshold of energy.

The reconstruction section 260 reconstructs the acquired measurement data using the applied setting information. Specifically, the acquired count values are collected as those in the set energy range and the image data is constructed for each energy range. Thus, for example, the distribution of the count values can be calculated for the aggregation regions having the same energy range. In this way, the reconstruction basically means outputting the count values managed respectively in energy ranges, but also includes reading out and outputting the measurement data as it is acquired according to the application.

The outputting section 270 outputs measurement data in a form corresponding to the type of X-ray measurement. For example, the distribution of count values is output for each of the aggregation regions where the energy ranges are the same. Thus, when the distribution of the count values of the specific energy range is required to be measured for each of the divided regions of the receiving surface, a plurality of energies required to be measured in a single measurement can be measured and it is possible to measure with a high efficiency.

(X-Ray Measurement Method)

Figure 5:
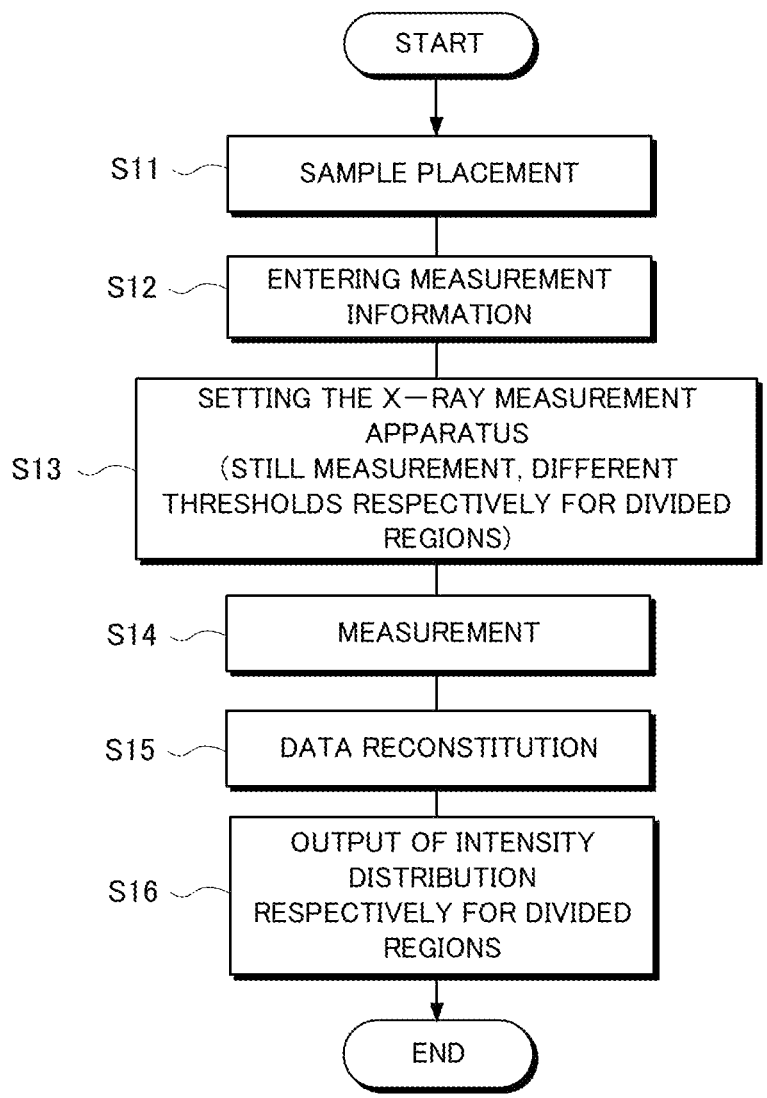
FIG. 5 is a flowchart showing the X-ray measurement method of the first embodiment.

A method of simultaneously measuring X-rays of different energies using the X-ray measurement system 10 configured as described above will be described. FIG. 5 is a flowchart showing the X-ray measurement method. First, the user installs a sample S in the X-ray measurement apparatus 50 (step S11). For example, when the diffracted Kα rays in one region and the Kβ rays in the other region are required to be measured with respect to the same sample, the user designates the measurement type and measurement region to the control apparatus 200 (step S12).

The control apparatus 200 converts the user's designation into setting information, and sets the energy range of the detected X-rays for each pixel of the X-ray detector 100 based on the setting information (step S13). For example, the setting information includes information of still measurement with fixing the X-ray detector 100, and an energy range for each region of the receiving surface. The X-ray detector 100 adjusts the zero point by the amplifier or the DA converter depending on the setting. Details of the zero point adjustment are described later.

The user instructs start of the measurement to the control apparatus 200 and X-ray measurement apparatus 50 performs X-ray measurement using the X-ray detector 100 by the instruction from the control apparatus 200 (step S14).

The control apparatus 200, as a result of X-ray measurement, acquires count values in the energy ranges set respectively for the pixels, and manages them as measurement data.

The control apparatus 200 manages the acquired measurement data of the count values and reconstructs them (step S15). For example, the energy range of each region of the receiving surface is calculated and associated with the count value. The measurement data is output in a form corresponding to the purpose of the X-ray measurement (step S16). For example, the distribution of count values in a region of a specific energy range can be displayed on one screen, and the distribution of count values in a region of another energy range can be displayed on another screen.

(Zero Point Adjustment)

As described above, the zero point adjustment is performed by appropriately setting the amplification degree and the offset value.

Figure 6:
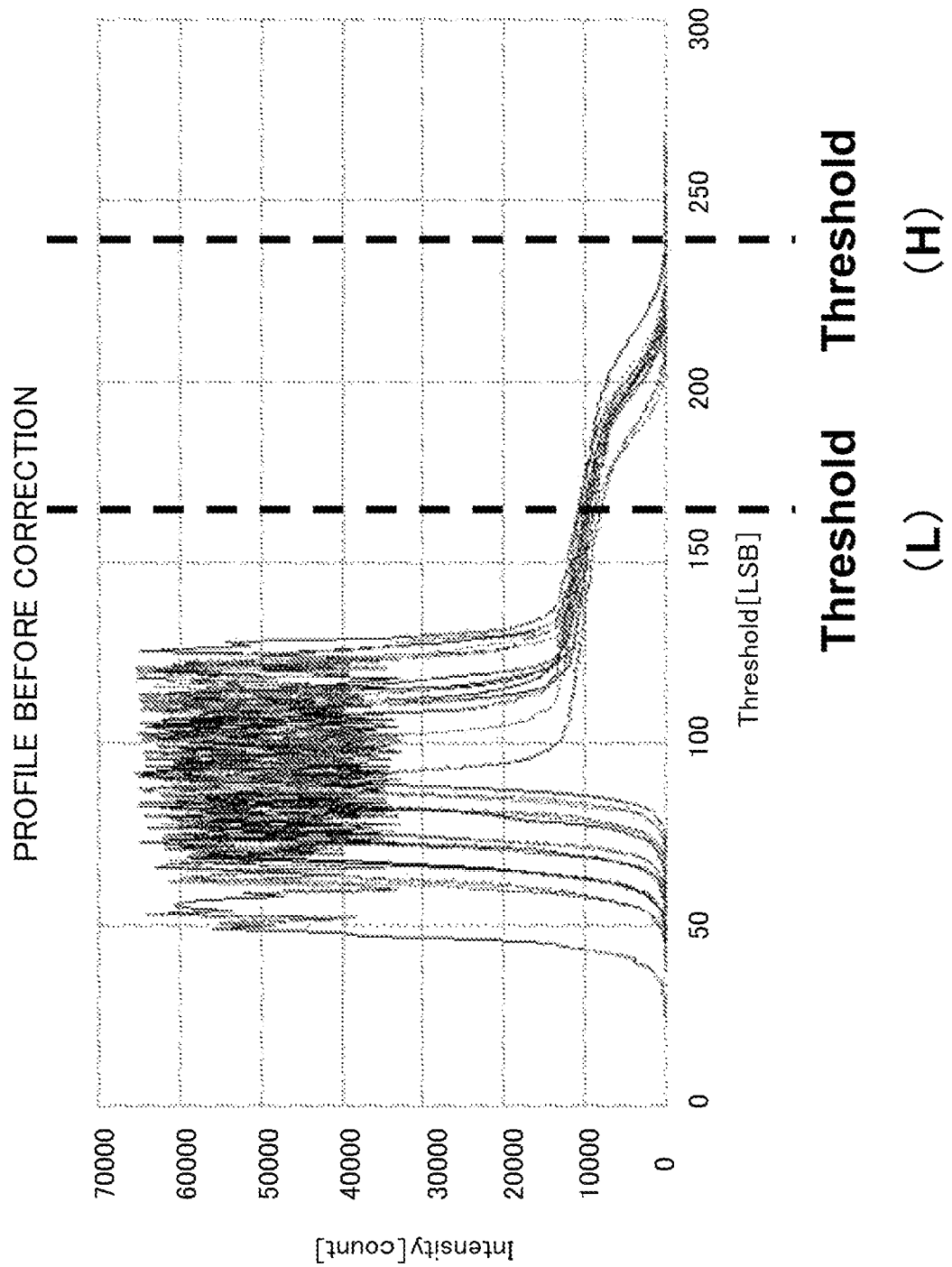
FIG. 6 is a graph showing the profile before correction for a plurality of pixels.

FIG. 6 is a graph showing the profile before correction for a plurality of pixels. The term "correction" herein refers to correction of variation for each pixel. There is variation in the wave height by X-ray received in each pixel. However, as shown in FIG. 6, the desired peaks can be detected by uniformly setting the LOW side and HIGH side thresholds for all pixels. The uniform threshold is based on a global setting determined by a constant voltage with respect to ground.

Figure 7A:
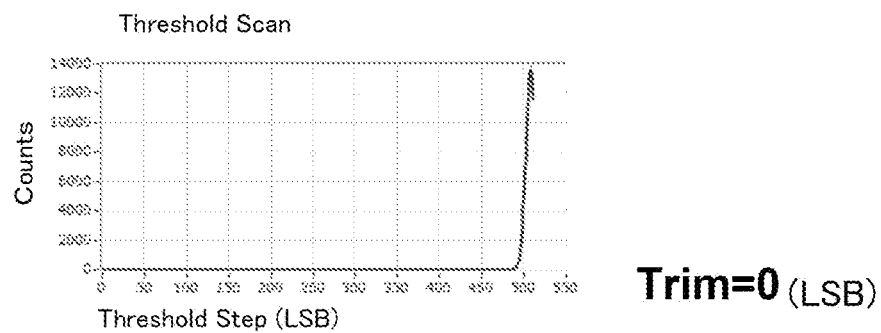
FIGS. 7A to 7C are graphs showing zero point adjustments by Trim-DAC.
Figure 7B:
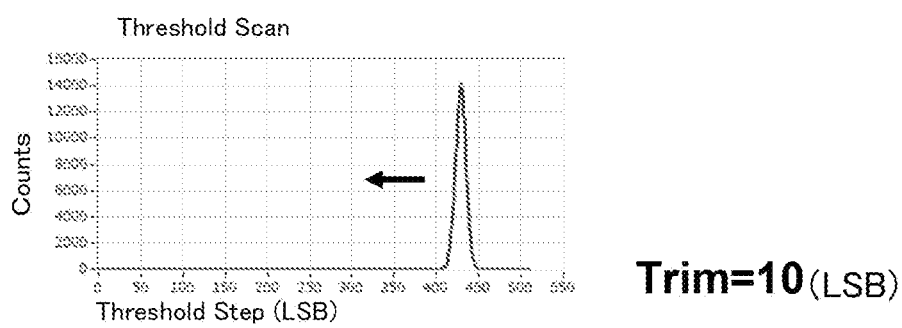
Figure 7C:
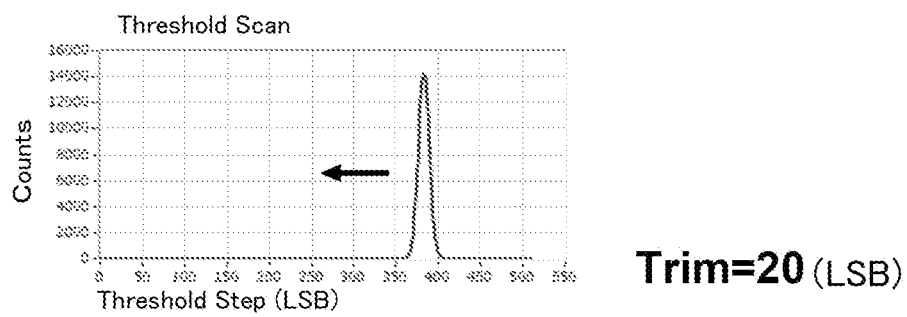

FIGS. 7A to 7C are graphs showing zero point adjustments by Trim-DAC circuitry. The horizontal axis of the graph indicates the global threshold, and the vertical axis indicates the count value. In the example shown in FIGS. 7A to 7C, in order to visually show the change in the position of the zero point due to Trim-DAC, it is shown how the waveform obtained by changing the global threshold from 0 to 512 moves when the values of Trim-DAC are 0, 10 and 20. Although LSB (Least Significant Bit) is described as a unit in the figures, the change amount of the actual signal in 1 bit is different with comparison between 1 bit in Trim-DAC circuitry and 1 bit of the signal for setting the threshold of the pulse height discriminator.

FIG. 7A shows the graph when the trimming value of the zero point adjustment is v0. In contrast, FIG. 7B shows the energy threshold is relatively raised by 10 by trimming as zero point adjustment (i.e., the zero point is lowered). Further, FIG. 7C shows the zero point is also adjusted to make the energy thresholds relatively increased by 20 (i.e., the zero point is lowered further). Thus, it is possible to adjust the zero point in the detection circuit 130.

In the example shown in FIGS. 7A to 7C, for example, it is assumed that the global threshold value is set to 400 and the Trim value is adjusted. In the example shown in FIG. 7A, the energy threshold is −4 keV. In the example in FIG. 7B, the energy threshold is 1.2 keV. In the example shown in FIG. 7C, the energy-threshold is +1 keV. In this way, the energy threshold can be different for each pixel.

Second Embodiment

Although the first embodiment is suitable for still measurement, there are cases in which acquisition of images should be performed in synchronization with movement represented by TDI (Time Delay Integration) measurement. In the present embodiment, the X measurement apparatus and the control apparatus have the same configuration, but a different measurement method is applied.

(X-Ray Measurement Method Using TDI Scan)

Figure 8:
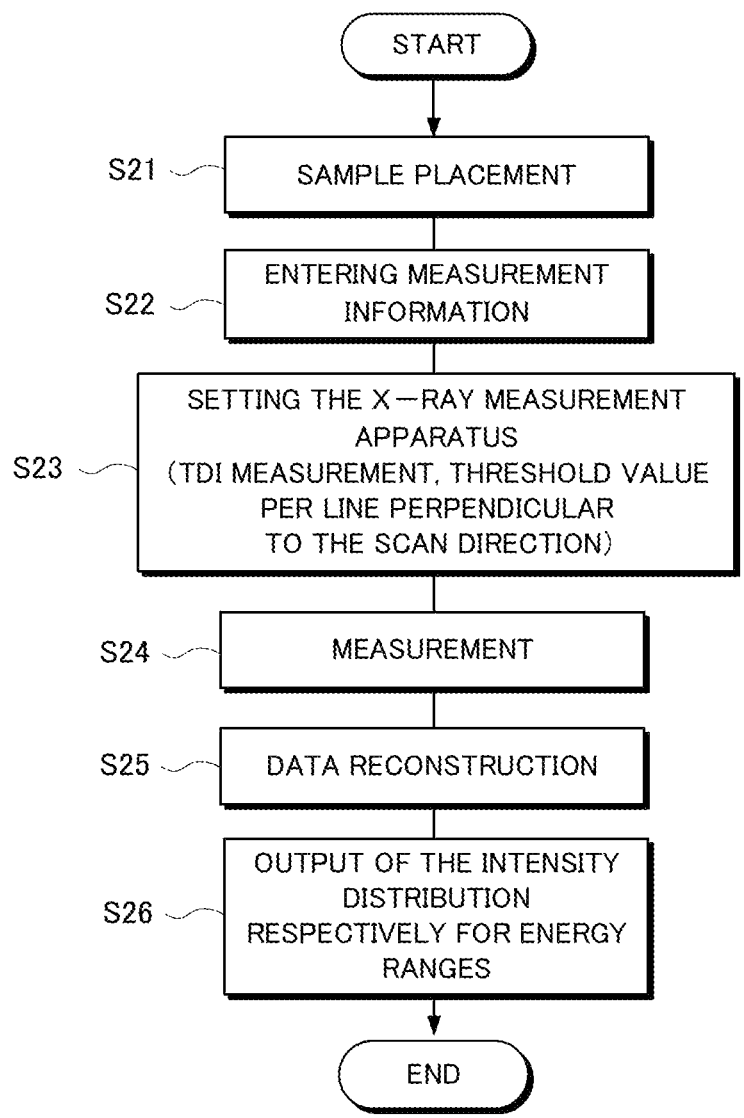
FIG. 8 is a flowchart showing the X-ray measurement method of the second embodiment.

FIG. 8 is a flowchart showing an X-ray measurement method using TDI measurement. First, the user installs the sample in the X-ray measurement apparatus (step S21). For example, when X-rays are desired to be detected in each of a plurality of energy ranges in a certain region, the user designates a measurement type and a measurement region to the control apparatus 200 (step S22).

The control apparatus 200 converts the user's designation into setting information, and the energy range of the detected X-rays are set for each pixel of the X-ray detector 100 based on the setting information (step S23). For example, the setting information includes information on TDI measurement and energy range for each line. The X-ray detector 100 adjusts the zero point by the amplifier or the DA converter depending on the setting.

When TDI scanning of the X-ray detector 100 are performed for each line perpendicular to the direction of movement of the X-ray detector 100 in the TDI scan, each of the energy ranges is allocated to the pixel.

The user instructs the measurement start to the controller 200, performs X-ray measurement while moving the X-ray detector 100 by an instruction from the control apparatus 200 (step S24). The control apparatus 200 acquires count values of the energy ranges set respectively for pixels as a result of X-ray measurement, and manages them as measurement data.

The control apparatus 200 manages and reconstructs the acquired measurement data of the count values (step S25). For example, the control apparatus 200 makes the count value correspond to each of the pixels and energy ranges. Then, the control apparatus 200 reconstructs the count values of all the detection regions for set energy ranges each. The control apparatus 200 outputs the distribution of counts for each energy range to each screen. In this way, the measurement data is output in a form corresponding to the purpose of the X-ray measurement (step S26).

(Example of Using TDI Scan)

Figure 9:
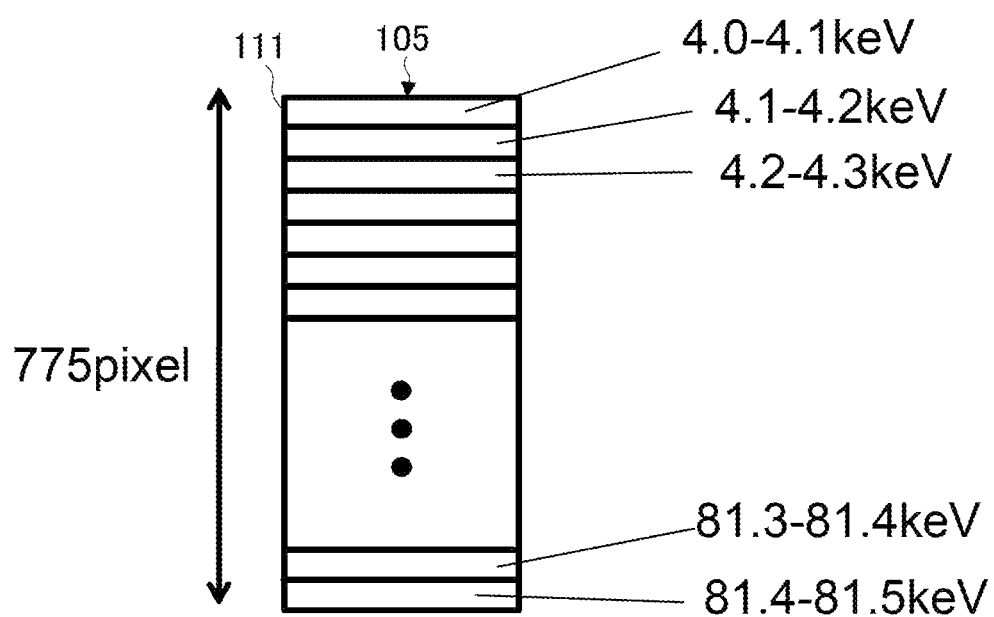
FIG. 9 is a schematic diagram showing the setting of the X-ray detector of the second embodiment.

When each energy range is allocated to pixels, a TDI measurement is set in the X-ray measurement apparatus 50 to determine a substantial threshold for each line (pixel column) perpendicular to the scan direction. FIG. 9 is a schematic diagram showing a setting of the X-ray detector 100. In the example shown in FIG. 9, the energy ranges are set to 4.0 to 4.1 keV, 4.1 to 4.2 keV, and 4.2 to 4.3 keV. for the lines 111 each on the receiving surface 105. For example, when the respective different energy ranges for all of the 775 lines are set, X-ray detection images of 775 different energy ranges are acquired. By performing TDI scan based on setting in this way, measurement data of a plurality of energy ranges are acquired with respect to the same angle. Such a measurement can be referred to as a virtual MCA measurement.

By applying the above example, different energy ranges can be set for the lines each, and energy profiles can be constructed based on the set energy ranges. In addition, the results can be used to identify Kα and Kβ rays and to remove Kβ rays from the energy profile. The finer the energy range is set, the finer the energy profile can be obtained and Kβ rays can be removed with high accuracy.

In the above example, a TDI scan is used as a imaging technique, but the imaging technique is not limited to a TDI scan as long as the imaging is synchronized with the movement. Instead of the TDI scan, a predetermined line portion (e.g., one line portion) may be swung in the scan direction or in the rotation direction around the center of the detection region.

Third Embodiment

In the first embodiment, the measurement is performed by changing the energy range that can be detected for each specific region of the receiving surface, it is also possible to perform the measurement of different energy ranges in a wide region simultaneously. In the present embodiment, the X measurement apparatus and the control apparatus have the same configuration, but a different measurement method is used.

(X-Ray Measurement Method by Still Measurement of Multiple Colors)

Figure 10:
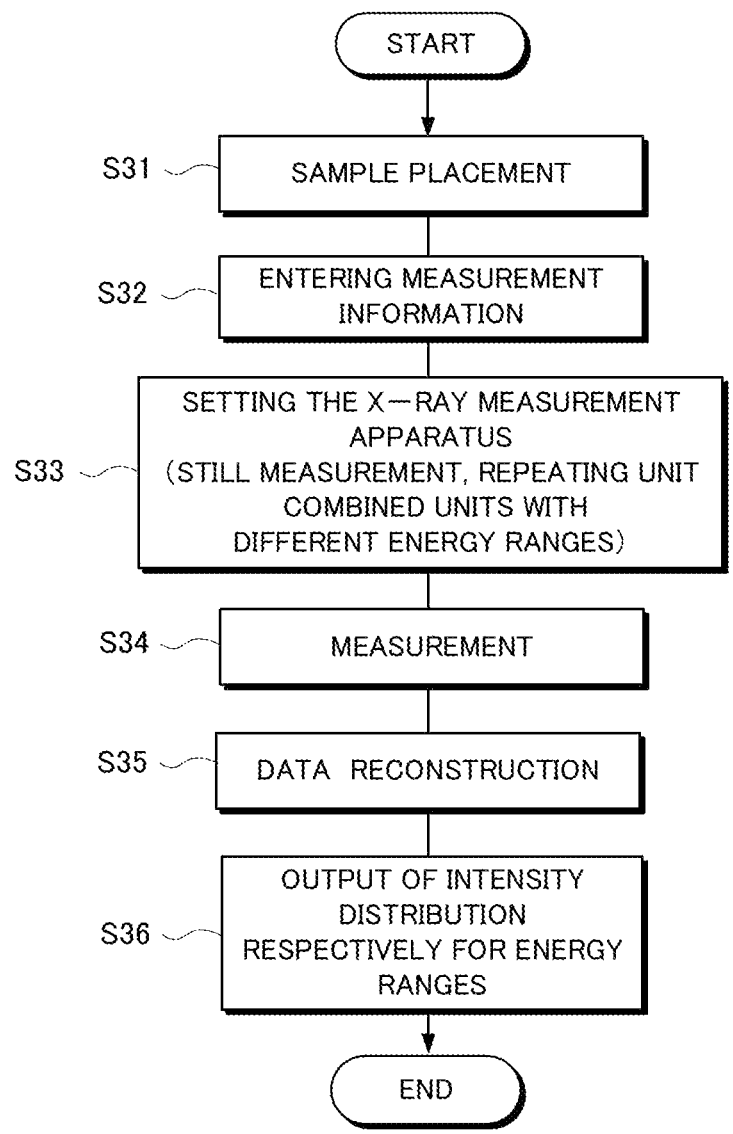
FIG. 10 is a flowchart showing the X-ray measurement method of the third embodiment.

FIG. 10 is a flowchart showing an X-ray measurement method by still measurement of a plurality of colors. First, the user places the sample S in the X-ray measurement apparatus 50 (step S31). For example, when X-rays are required to be detected in each of a plurality of predetermined energy ranges in a wide region, the user designates a measurement type and a measurement region to the control apparatus 200 (step S32).

The control apparatus 200 converts the user's designation into setting information, and sets the energy ranges of detected X-rays respectively for the pixels in the X-ray detector 100 based on the setting information. For example, the setting information is information of a still measurement and a region to be measured. The X-ray detector 100 adjusts the zero point by the amplifier or the DA converter depending on the setting.

At this time, it is preferable that the setting section 220 sets each of the plurality of types of energy ranges to be distributed respectively to the pixels in the detector. Thus, data of a plurality of types of energy ranges can be acquired by still measurement at the same time. However, the positional resolution is lowered to some extent. Note that "dispersion" described above is preferably made uniform. "Uniform" includes not only regularly arranged, but also randomly arranged.

The user instructs to start the measurement to the control apparatus 200, the X-ray measurement apparatus 50 performs X-ray measurement with fixing the X-ray detector 100 by the instruction from the control device 200 (step S34). The control apparatus 200 acquires count values of the energy range set respectively for the pixels as a result of X-ray measurement, and manages them as measurement data.

The control apparatus 200 manages and reconstructs the acquired measurement data of the count values (step S35). For example, the control apparatus 200 makes the count values correspond to the pixels and energy ranges each. Then, the outputting section 270 reconstructs the count values of the entire detection region for pixels respectively set a predetermined energy range. In this case, for example, diffraction images of X-rays of a plurality of wavelengths are simultaneously obtained although the accuracy of the positional information is lowered. The distribution of the count values of the entire detection region are output respectively for energy ranges as a form corresponding to the purpose of X-ray measurement to each screen (step S36).

(Specific Example of Multi-Color Still Measurement)

Figure 11:
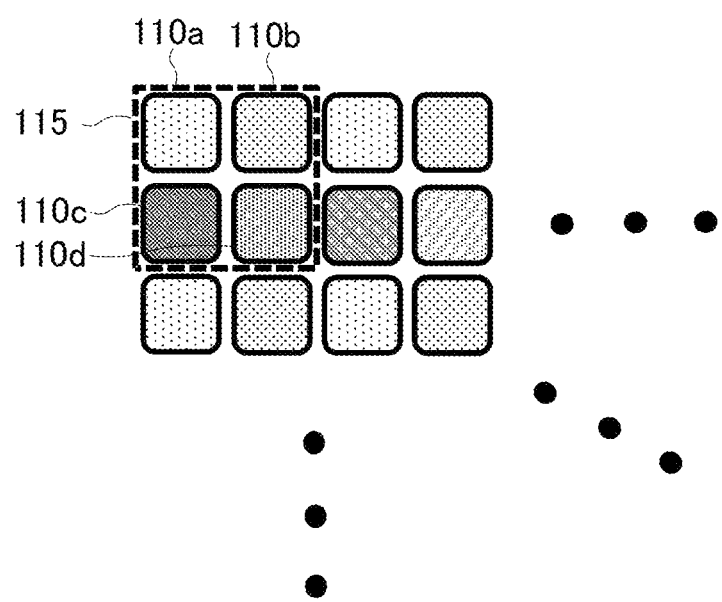
FIG. 11 is a schematic diagram showing the setting of the X-ray detector of the third embodiment.

Preferably, the setting section 220 sets the energy range of each pixel so that the repeating unit region including pixels in all kinds of the energy ranges is periodically repeated. FIG. 11 is a schematic diagram showing the setting of the X-ray detector.

In the example shown in FIG. 11, four pixels 110a to 110d (four colors) respectively having a predetermined energy range are set as a repeating unit 115, and the energy range of each pixel is set. Thus, data of a plurality of types of energy ranges can be simultaneously acquired by the still measurement with the simple configuration. In the above example, four pixels constitute a repeating unit, but nine pixels (nine colors) may constitute a repeating unit. Further, such regularity may not be provided, and a plurality of kinds of pixels may be set in a random arrangement.

Fourth Embodiment

According to the above embodiment, it is possible to output the distribution of the count values of the entire detection region respectively for energy ranges to each screen, it is also possible to output the distribution of energies respectively for the position of pixels. By using these two outputting methods to detect the X-rays scattered by irradiating X-rays of a specific wavelength to the sample with an X-ray detector in the step of detection, it is possible to simultaneously detect the diffracted X-rays and fluorescent X-rays. Such a method can be applied, for example, in measurements using TDI scans.

Fifth Embodiment

Although whether the characteristic X-ray or the white X-ray is used is not particularly limited in the above embodiment, analysis data in a wide range in the k-space can be acquired in a narrow scan range by using the white X-ray. In this case, since the scanning range is narrow, the experiment with time can be performed efficiently. Since the diffraction conditions of the crystal is $2d \sin \theta = n\lambda$, if it can be measured by changing the $\lambda$ than measured at a constant $\lambda$, it is possible to acquire a wide range of diffraction images in the k-space even for an object limiting variable range of θ.

For example, even when there is a limit in the scan range, it is possible to obtain a result similar to that obtained with scan measurement by using a white X-ray as an X-ray source. Therefore, it is possible to carry out In-situ experiments or the like which are difficult when the characteristics X-ray is used.

In all the above embodiments, the control apparatus 200 is configured as a single apparatus, but may be configured as a system in which some functions or configurations are provided on the cloud. Further, the function of the control apparatus 200 may be provided as a circuit in the X-ray detector 100. Further, in the above embodiments, the global threshold value is set in common to all the regions, but the global threshold value may not be set, and the energy threshold value may be set for each unit region.

Incidentally, this international application claims priority under Japanese Patent Application No. 2020-011214, filed Jan. 27, 2020, and the entire contents of Japanese Patent Application No. 2020-011214 are incorporated in this international application.

DESCRIPTION OF SYMBOLS

10 X-ray measurement system
50 X-ray measurement apparatus
60 X-ray irradiation section
70 sample support section
80 driving section
100 X-ray detector
105 receiving surface
110 sensor (pixel)
110a-110d pixels
111 line 115 repeating unit
120 readout circuit
130 detection circuit
131, 133 amplifier
132, 134, 135, 137 DA converter
t1 source of threshold voltage
g1 supply source for gain setting voltage
136, 138 pulse-height discriminator
141, 142 counter
150 memory
160 transfer circuit
200 control apparatus
210 inputting section
220 setting section
230 setting information management section
250 data management section
260 reconstruction section
270 outputting section
S sample

The invention claimed is:

1. An X-ray measurement system comprising:
an X-ray measurement apparatus having an X-ray detector; and
a control apparatus for controlling the X-ray detector and outputting a measurement result, wherein
the control apparatus comprising or configured to set an energy range of X-rays to be detected for each unit region of the X-ray detector, the X-ray detector being capable of setting only a single energy range for each unit area, acquire a count value of the set energy, range for each unit region as measurement data by a result of the X-ray measurement, and output the measurement data,
the process or s a pair of upper and lower limits of different energy ranges for respective unit regions in at least two or more unit regions, and
the processor performs at least one of the zero point shift and gain change of a signal input by X-ray detection for each unit region with respect to a global threshold constant in all the regions to set the energy range.

2. The X-ray measurement system according to claim 1, wherein the processor performs the zero point shift by changing setting of a DA converter in the X-ray detector.

3. The X-ray measurement system according to claim 1, wherein the processor sets the energy range in each of one or a plurality of aggregation regions which are formed by aggregation of the unit regions adjacent to each other in the X-ray detector and having an arbitrary size and shape.

4. The X-ray measurement system according to claim 1, wherein the processor sets each of a plurality of types of energy ranges to be distributed to each unit region on the receiving surface.

5. The X-ray measurement system according to claim 4, the processor sets a repeating unit region including one unit region of all types of the energy range to be periodically repeated.

6. The X-ray measurement system according to claim 1, wherein one type of an X-ray source is used even for the set different energy ranges for the respective unit regions.

7. The X-ray measurement system according to claim 1, wherein
the processor sets the pair of upper and lower limits of different energy ranges for the respective unit regions in the at least two or more unit regions to set two or more energy ranges for one type of X-ray source.

8. The X-ray measurement system according to claim 1, wherein
one area measures $K\alpha$ radiation, the other area measures $K\beta$ radiation.

9. The X-ray measurement system according to claim 1, wherein
the processor sets the pair of upper and lower limits of different energy ranges for the respective unit regions in the at least two or more unit regions to set two or more energy ranges for one type of X-ray source, and
one area measures $K\alpha$ radiation, the other area measures $K\beta$ radiation.

10. A control apparatus for controlling an X-ray detector and outputting a measurement result, comprising:
a processor configured to set an energy range of X-rays to be detected for each unit region of the X-ray detector, acquire a count value of the set energy range for each unit region as measurement data by a result of the X-ray measurement, and
output the measurement data, wherein
the processor sets a pair of upper and lower limits of different energy ranges in at least two or more unit regions, wherein
the X-ray detector is capable of acquiring images with settings synchronized with movement,
the processor allocates each energy range for each line perpendicular to the movement direction of the X-ray detector in the acquisition of images with settings synchronized with movement, each of the lines being configured of the unit regions, and
the processor outputs count values of all detection regions reconstructed for each of the set energy ranges.

11. A method for simultaneously measuring X-rays of different energies, comprising steps of:
setting an energy range of X-rays to be detected for each unit region of an X-ray detector, said setting only a single energy range for each unit area,
performing X-ray measurement using the X-ray detector,
acquiring a count value as measurement data in the set energy range for each unit region by a result of the X-ray measurement,
outputting the measurement data, wherein
a pair of upper and lower limits of different energy ranges for each respective unit region is set in at least two or more unit regions in setting the energy ranges, and
performing at least one of the zero point shift and gain change of a signal input by X-ray detection for each unit region with respect to a global threshold constant in all the regions to set the energy range.

12. The method according to claim 11, wherein the X-ray detector is a two-dimensional detector, and in the detecting step, a sample is irradiated with X-rays of a specific wavelength and scattered X-rays are detected by the X-ray detector, thereby diffraction X-rays and fluorescent X-rays are detected simultaneously.

13. The method according to claim 11, wherein the X-ray detector is a two-dimensional detector, and in the detecting step, a sample is irradiated with white X-rays and scattered X-rays are detected by the X-ray detector.

14. The method according to claim 11, wherein one type of an X-ray source is used even for the set different energy ranges for the respective unit regions.

15. A non-transitory computer readable recording medium having recorded thereon a program for controlling an X-ray detector and outputting measurement results, the program making a computer execute processes of:

setting an energy range of X-rays to be detected for each unit region of an X-ray detector, said setting only a single energy range for each unit area, acquiring a count value as measurement data in the set energy range for each unit region by a result of X-ray measurement, outputting the measurement data, wherein a pair of upper and lower limits of different energy ranges for respective unit region is set in at least two or more unit regions in setting the energy ranges, and performing at least one of the zero point shift and gain change of a signal input by X-ray detection for each unit region with respect to a global threshold constant in all the regions to set the energy range.

16. The non-transitory computer readable recording medium according to claim 15, wherein one type of an X-ray source is used even for the set different energy ranges for the respective unit regions.

* * * * *